United States Patent Office 3,709,780
Patented Jan. 9, 1973

3,709,780
PROCESS AND PRODUCT FOR MAKING PAPER
PRODUCTS OF IMPROVED DRY STRENGTH
Robert Clayton Slagel, Pittsburgh, and Gloria Di Marco
Sinkovitz, Bridgeville, Pa., assignors to Calgon Corporation, Pittsburgh, Pa.
No Drawing. Continuation-in-part of application Ser. No. 160,097, July 6, 1971. This application Nov. 4, 1971, Ser. No. 195,815
Int. Cl. D21d 3/00; D21h 3/40
U.S. Cl. 162—168        5 Claims

ABSTRACT OF THE DISCLOSURE

Paper products exhibiting markedly improved dry strength properties are produced by adding to the cellulose paper dispersion a chitin-based compound comprising a graft copolymer of 2-acrylamido-2-methylpropane sulfonic acid onto a chitosan substrate.

BACKGROUND OF THE INVENTION

This application is a continuation-in-part of our application Ser. No. 160,097, filed July 6, 1971. In our parent application, we disclosed the use of graft copolymers of certain acrylic and/or diallylic monomers grafted onto a chitosan substrate as dry strength additives in the paper making process. We have since discovered that a particularly useful acrylic monomer for grafting onto chitosan is 2-acrylamido-2-methylpropane sulfonic acid. In addition, we have found that graft copolymers of this monomer onto a chitosan backbone yield polymers which are useful dry strength additives.

The present invention is directed to paper products exhibiting markedly improved dry strength properties. These products are prepared by incorporating into the paper product a novel graft copolymer of certain acrylic monomers, particularly 2-acrylamido-2-methylpropane sulfonic acid, grafted onto a chitosan substrate. These chitin compounds are incorporated into the paper product during the paper making process, preferably by adding them to the aqueous cellulosic pulp dispersion.

It is a well-accepted fact that it is desirable in many applications to have paper products with good dry strength. In addition, it is well known that the paper industry has a strong movement underway to reduce the basis weight of paper, especially that of publication-grade paper. Reduced basis weight in paper would correspondingly reduce mailing cost. Dry strength aids are needed for lighter weight paper because as the basis weight is lowered, the dry strength of the paper also decreases. By using dry strength additives to maintain the strength of the lower basis weight paper, the production costs are reduced since less pulp and power are needed to make an equivalent sheet.

In the past, natural polymers such as guar and locust bean gums and the native and modified starches have been the most commonly used dry strength additives. The performance of these natural polymers is difficult to control and hence somewhat inconsistent. In addition, the use of starches involves lengthy preparation procedures and they are not well retained by the fibers without the use of additional costly additives. However, because of their low cost and availability, these compounds have heretofore been used despite their disadvantages.

More recently, several synthetic dry strength resins have appeared on the market. These compounds are basically modified polyacrylamides or modified cationic starch derivatives. These compounds, while somewhat effective under normal conditions, do not maintain paper strength at lower basis weight and they do not function well in alkaline media. The requirement of functioning well in an alkaline system is important since there is a desire in the paper industry to change from the present acid (pH 4 to 5.5) system of making making to neutral or alkaline (pH 7 to 8.5) system. The acid system is detrimental to machine parts and results in a paper sheet that becomes brittle and yellow with age. Another advantage of an alkaline system is that an inexpensive pigment, such as calcium carbonate, can be used instead of the more expensive titanium dioxides and aluminum oxides.

Therefore, it is an object of this invention to produce a dry strength additive which works well in low basis weight paper, gives consistent performance and performs in both alkaline and acidic systems.

SUMMARY OF THE INVENTION

We have found that paper products have superior dry strength properties when they contain from 0.1 to 5.0 percent by weight based on the dry weight of the paper of a graft copolymer of certain acrylic monomers grafted onto a chitosan substrate, particularly 2-acrylamido-2-methylpropane sulfonic acid.

Chitin is a naturally-occurring linear amino polysaccharide found in crustacean shells. It is a long, unbranched polysaccharide-like cellulose in which the hydroxyl group of the $C_2$ carbon has been replaced by an acetylamino group. Chemically, it is a polymer of acetylated d-glucosamine. The structure of chitin is shown below. The basic repeating unit is the two hexose residue and the naturally-occurring chitin contains from about 1,000 to 3,000 basic units.

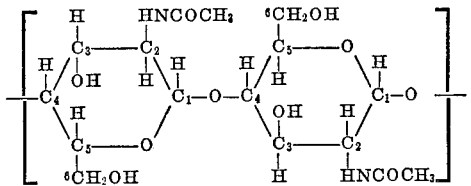

Chitosan is the acid-soluble deacetylated derivative of chitin. It is prepared by reacting chitin with an aqueous hydroxide solution. The formula of chitosan is shown below.

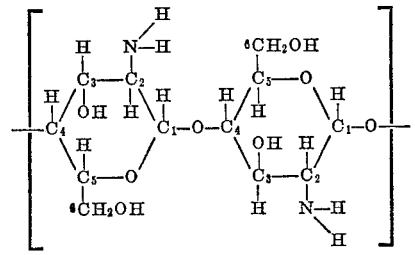

Both chitin and chitosan are well reported in the literature. For example, see the article entitled "Chitin" by A. B. Foster and J. M. Weber in Advances in Carbohydrate Chemistry, v. 15 (1960), pp. 371–393 and in the article entitled "Chitin and Its Association With Other Molecules" by K. N. Rudall, Journal of Polymer Science, Part C, No. 28, pp. 83–102 (1969). Finally, see the article "Chitosan: A Natural High Polymer Not Well Known in Industry" by Patrick Broussighac, found in Chemie et Industrie, Genie Chem., v. 99, No. 9, pp. 1241–1247 (1968). In addition, see U.S. Pat. 3,533,940, which is directed to chitin and chitosan and their use in treating water to remove impurities.

The chitosan useful in our invention is prepared by reacting chitin with concentrated alkali at high temperatures. The reaction may be run as a fusion reaction or as a solution so long as the resulting product is at least a partially deacetylated product of sufficient solubility. That is, it has a solubility of about 1 percent by weight in dilute acid solutions (≈3%). We prefer to prepare the chitosan by reacting chitin with about a 40 percent aqueous sodium hydroxide solution for several hours at temperatures of about 130 to 150° C. We have found that chitosan is a useful dry strength additive in both alkaline and acid paper processes when used alone. In addition, we have also found that graft polymers of chitosan and certain acrylic and diallylic monomers yield excellent dry strength additives.

The useful monomers used in preparing the graft copolymers with chitosan are acrylamide, methacrylamide, acrylic acid, methacrylic acid and particularly 2-acrylamido-2-methylpropane sulfonic acid. In addition, mixtures of one or more of these monomers are also useful in obtaining a polymer with the desired properties so long as it contains 2-acrylamido-2-methylpropane sulfonic acid or its water-soluble salt.

There are many well-known methods of grafting monomers onto carbohydrate substrates as is realized by one skilled in the art. The method ultimately chosen is not important so long as it yields a graft polymer onto a chitosan substrate. The method which we used is the ceric salt redox system. It is known that certain ceric salts form a redox system when coupled with certain reducing agents such as alcohols, aldehydes, or amines. The reaction proceeds by a single electron transfer step, resulting in cerous ion and a partially oxidized reducing agent in free radical form; the free radical being formed on the chitosan backbone. If a monomer is present, polymerization will occur. However, since the free radical is on the chitosan substrate, only graft polymers will be formed without contamination of other polymers. Using this method, we have prepared various graft copolymers with chitosan. However, the same copolymers may be prepared using any other of the well known grafting techniques. Examples 1 to 6 below illustrate the preparation of some of the graft copolymers of our invention.

Example 1

Into a one liter, four-necked flask equipped with purge tube, thermometer, stirrer and condenser was added the following reagents: twenty grams of chitosan, thirty grams of acrylamide and four hundred fifty grams of a 15 percent acetic acid solution. The compounds were then heated to 30° C. and stirred for one hour while being purged with nitrogen. The ceric catalyst was then added. The catalyst was a 0.1 normal ceric ammonium nitrate in one normal nitric acid solution. Five milliliters of the ceric solution was added and the reaction mixture stirred for three hours at 30° C. After three hours, the polymer was diluted to 1 to 5 percent solids with water and precipitated with acetone. The graft polymer was then dried under vacuum for twenty-four hours and tested for its dry strength properties.

Example 2

Into a one liter, four-necked flask equipped with purge tube, thermometer, stirrer and condenser was added the following reagents: five grams of chitosan, forty-five grams of acrylamide and four hundred fifty grams of a 15 percent acetic acid solution. The mixture was then heated to 30° C. and purged for one hour with nitrogen gas. Five milliliters of the ceric catalyst solution was then added. The catalyst solution was a 0.1 normal ceric ammonium nitrate in one normal nitric acid. The mixture was then stirred for three hours at 30° C. After three hours, the polymer was diluted with water and precipitated with acetone and dried under vacuum for twenty-four hours. It was then tested for dry strength properties.

Example 3

Into a one liter, four-necked flask equipped with purge tube, thermometer, stirrer and condenser was added the following reagents: five grams of chitosan, 40.5 grams of acylamide, 4.5 grams of acrylic acid and four hundred fifty grams of a 15 percent acetic acid solution. The mixture was heated to 30° C. and purged for one hour with nitrogen gas. Five milliliters of the ceric catalyst solution was then added. The catalyst was a 0.1 normal ceric ammonium nitrate in one normal nitric acid. The mixture was then stirred for three hours at 30° C. After three hours, the polymer was diluted to about 1 to 5 percent solids with water and precipitated with acetone. It was then dried under vacuum and evaluated.

Example 4

Into a one liter, four-necked flask equipped with purge tube, thermometer, stirrer and condenser was added the following reagents: twenty grams of chitosan, twenty-seven grams of acrylamide, three grams of acrylic acid and four hundred fifty grams of a 15 percent acetic acid solution. The mixture was heated to 30° C. and purged for one hour with nitrogen gas. Five milliliters of the ceric catalyst solution was then added. The catalyst was a 0.1 normal ceric ammonium nitrate in one normal nitric acid. The mixture was then stirred for three hours at 30° C. After three hours, the polymer was diluted to about 1 to 5 percent solids with water and precipitated with acetone. It was then dried under vacuum and evaluated.

Example 5

Into a one liter, four-necked flask equipped with purge tube, thermometer, stirrer and condenser was added the following reagents: eight grams of chitosan, 10.8 grams of acrylamide, 1.2 grams of 2-acrylamido-2-methylpropane sulfonic acid and one hundred seventy-eight grams of a 15 percent acetic acid solution. The mixture was purged with nitrogen for one hour at 30° C. Then two milliliters of the ceric catalyst solution was added. The catalyst was a 0.1 normal ceric ammonium nitrate in one normal nitric acid. The mixture was stirred for three and one half hours at 30° C. The resulting graft polymer solution was diluted with water and precipitated from acetone.

Example 6

Into a one liter, four-necked flask equipped with purge tube, thermometer, stirrer and condenser was added the following reagents: eight grams of chitosan, 10.8 grams of acrylamide, 1.2 grams of 2-acrylamido-2-methylpropane sulfonic acid and one hundred seventy-eight grams of a 15 percent acetic acid solution. The mixture was purged with nitrogen for one hour at 30° C. Then two milliliters of a 0.1 normal ceric ammonium nitrate solution in one normal nitric acid was added. The mixture exothermed to about 37° C. and was held at that temperature for about three and one half hours. The resulting graft polymer solution was diluted with water and precipitated from acetone.

We have prepared many additional graft copolymers using various other monomers and combinations of monomers. The monomers useful in our invention are 2-acrylamido-2-methylpropane sulfonic acid, acrylamide, methacrylamide, acrylic acid and methacrylic acid.

The graft copolymers of our invention comprise from 5 to 99.5 percent by weight of the chitosan substrate and the remaining percentage being derived from one or more of the above mentioned monomers.

It is also a requirement of this invention that at least 2.5 percent by weight of the monomers which are grafted onto the chitosan substrate is 2-acrylamido-2-methylpropane sulfonic acid. It is preferred that the 2-acrylamido-2-methylpropane sulfonic acid comprise at least about 5 percent by weight of the monomers grafted onto the chitosan. In many cases, it might be desirable to graft only the 2-acrylamido-2-methylpropane sulfonic acid onto the chitosan. Therefore, the invention covers chitosan graft copolymers wherein 2-acrylamido-2-methylpropane sulfonic acid comprises from 2.5 to 100 percent by weight of the monomers grafted onto the chitosan substrate, preferably from 5 to 100 by weight.

The 2-acrylamido-2-methylpropane sulfonic acid of our invention is not new and has been reported in the literature. For example, see Kaufman Canadian Patent 864,433. In addition, see Arlt et al. U.S. Patent 3,547,899, which discloses and claims the composition of 2-acrylamido-2-methylpropane sulfonic acid-containing polymers. Finally, see U.S. Patents 3,388,199, 3,332,904 and 3,506,707. Moreover, the term 2-acrylamido-2-methylpropane sulfonic acid as used herein is inclusive of the water-soluble salts. The preferred salts are the ammonium and alkali metal salts especially sodium and potassium.

The chitin-based compounds of our invention were evaluated for their dry strength in alkaline media and also several compounds were evaluated in acidic media. The compounds were also evaluated at various feed rates ranging from 0.25 percent to about 1 percent by weight based on the weight of the dry pulp.

The compounds were evaluated by preparing a series of hand sheets on a Noble Wood machine using the various additives. The hand sheets were then conditioned at 50 percent RH for a minimum of twenty-four hours at 70° F. and then tested for burst and tensile strength. The strength values were reported as a percent increase over the control. The control was a hand sheet prepared under similar conditions except no dry strength additives were employed.

The pulp stock used in preparing the hand sheets was bleached, hardwood sulfite pulp. The freeness was 650 cc. Schopper Riegler. When using acid medium, 2 percent alum was also employed. However, when using alkaline medium, no additional additives other than the dry strength compound were used. The hand sheets prepared had a sheet weight of about three grams per sheet, which is approximately equivalent to forty-five pounds per 3,000 ft.² The dry strength compounds were added at the head box and mixed there for three minutes. When running under acid conditions, the head box and sheet mold pH was adjusted to 4.5 with 0.5 $NH_2SO_4$. When running under alkaline conditions, they were left unadjusted, which was a pH of from 7 to 9. During the preparation, there was no white water circulation. The sheets were dried for five minutes at 230° F. before conditioning and evaluating. The burst strength was tested by a Mullen Tester according to TAPPI standard test procedure T403. The tensile strength was tested by a TMI instrument in accordance with TAPPI standard test procedure T404.

Table 1 illustrates the general effectiveness of chitosan alone as a dry strength additive and also the effectiveness of several of the graft copolymers of the chitosan with several of the preferred comonomers. In the table, the compositions of the additives are given in weight percentages. For example, in Sample No. 2, Chitosan/AM (10/90) means a graft copolymer of acrylamide onto chitosan and the weight percentages are 10 percent chitosan and 90 percent acrylamide. The percent feed rate was 1 percent by weight based on weight of the dry pulp. The symbol AA means acrylic acid and AS means 2-acrylamido-2-methylpropane sulfonic acid.

TABLE 1

| Sample No. | Additive | Alkaline percent increase | | Acid percent increase | |
|---|---|---|---|---|---|
| | | Burst | Tensile | Burst | Tensile |
| 1 | Chitosan | 32.9 | 20.0 | 12.1 | 18.5 |
| 2 | Chitosan/AM (10/90) | 28.7 | 16.3 | | |
| 3 | Chitosan/AM (40/60) | (¹) | (¹) | 31.1 | 14.1 |
| 4 | Chitosan/AM/AA (10/81/9) | (¹) | (¹) | 32.7 | 19.0 |
| 5 | Chitosan/AM/AA (40/54/6) | 34.9 | 17.0 | 45.0 | 36.9 |
| 6 | Chitosan/AM/AS (40/54/6) | 19.6 | 3.6 | 54.4 | 22.1 |

¹ Flocked.

The paper of the present invention, generally, is prepared by forming an aqueous suspension of paper making cellulosic fibers, adding to said suspension a dry strength additive and any other desirable additive, sheeting the fibers to form a cellulosic web and heating the web until dry to form the paper.

The dry strength additives of the present invention may be added to the cellulosic pulp suspension in amounts ranging from 0.1 to 5.0 percent by weight based on the dry weight of the cellulosic fibers. Below 0.1 percent, no appreciable effect on the paper is noticeable and the use of concentrations in the neighborhood of 5 percent is generally an overtreatment. The preferred range is from 0.2 to 1.0 percent.

The exact pH and concentration at which the dry strength additives of our invention will be utilized in the paper making process will vary from instance to instance. It will depend largely on the type of cellulosic fiber being employed, the other common paper making additives being used and the properties desired of the final product. Accordingly, in each instance, the optimum conditions can easily be found by simple laboratory trials. However, the dry strength additives of our invention are effective within the pH range of about 3.5 to 9.0 and in the concentration range mentioned above.

The polymers of our invention may be added at any convenient point in the paper making process so long as they are added up stream from the fan pump. In addition, they may be added as a dry powder or an aqueous solution. The use of an aqueous solution is preferred since it insures a more uniform mixture of the additive and paper fibers.

The temperature at which the sheet is dried and the duration of the drying are not critical. The additives are substantially non-thermosetting and hence need not be subjected to any critical, drying conditions. Therefore, the invention contemplates that the paper will be produced by drying on rolls in the normal range of 190 to 250° F.

The dry strength additives of our invention are also compatible with most of the other commonly employed materials used in the paper formation. For example, they are compatible with rosin and the other common sizing agents, alum, the pigments such as clay, $CaCO_3$, and $TiO_2$ and the basically used dyes.

We claim:

1. An improved process for making paper having dry strength comprising forming an aqueous suspension of paper making cellulosic fibers, adding to said suspension a dry strength additive, sheeting the fibers to form a web and heating the web until dry to form the paper wherein the improvement comprises using as the dry strength additive, a graft copolymer comprising from 5 to 99.5 percent by weight of a chitosan substrate and the remainder derived from one or more monomers selected from the group consisting of acrylamide, methacrylamide, acrylic acid, methacrylic acid and 2-acrylamido-2-methylpropane sulfonic acid wherein at least 2.5 percent by weight of said remainder is derived from 2-acrylamido-2-methylpropane sulfonic acid and water-soluble salts thereof.

2. An improved process as in claim 1 wherein the monomers are selected from the group consisting of acrylamide, acrylic acid and at least 5 percent by weight of the remainder is 2-acrylamido-2-methyl-propane sulfonic acid and water-soluble salts thereof.

3. An improved process as in claim 1 wherein the monomers are acrylamide and 2-acrylamido-2-methylpropane sulfonic acid and water-soluble salts thereof.

4. An improved process as in claim 1 wherein the monomer is 2-acrylamido-2-methylpropane sulfonic acid and water-soluble salts thereof.

5. Paper of improved dry strength comprised of cellulosic fibers and a graft copolymer comprising from 5 to 99.5 percent by weight of a chitosan substrate and the remainder derived from one or more monomers selected from the group consisting of acrylamide, methacrylamide, acrylic acid, methacrylic acid, and 2-acrylamido-2-methylpropane sulfonic acid wherein at least 2.5 percent by weight of said remainder is derived from 2-acrylamido-2-methylpropane sulfonic acid and water-soluble salts thereof.

References Cited

UNITED STATES PATENTS

| | | | |
|---|---|---|---|
| 2,216,845 | 10/1940 | Larson | 162—177 |
| 3,445,556 | 5/1969 | Kuzmak et al. | 260—17.4 GC |
| 3,288,770 | 11/1966 | Butler | 260—47 R |
| 2,748,029 | 5/1956 | Spear et al. | 162—168 |
| 3,639,208 | 2/1972 | Varveri et al. | 162—168 |
| 2,492,702 | 12/1949 | Newbert et al. | 162—168 |
| 3,000,840 | 9/1961 | Johnson et al. | 260—17.4 ST |

ROBERT L. LINDSAY, JR., Primary Examiner

K. M. SCHOR, Assistant Examiner

U.S. Cl. X.R.

260—17.4 GC; 162—175, 177